(12) United States Patent
Himmelmann

(10) Patent No.: US 8,847,444 B2
(45) Date of Patent: Sep. 30, 2014

(54) COOLING OF PERMANENT MAGNET ELECTRIC MACHINE

(75) Inventor: Richard A. Himmelmann, Beloit, WI (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 293 days.

(21) Appl. No.: 12/944,916

(22) Filed: Nov. 12, 2010

(65) Prior Publication Data
US 2012/0119602 A1 May 17, 2012

(51) Int. Cl.
H02K 9/10 (2006.01)
H02K 9/197 (2006.01)
H02K 9/18 (2006.01)
H02K 5/20 (2006.01)

(52) U.S. Cl.
CPC *H02K 9/197* (2013.01); *H02K 9/18* (2013.01); *H02K 5/20* (2013.01)
USPC .................................. 310/57; 310/52; 310/64

(58) Field of Classification Search
USPC .............................. 310/52, 54, 58–59, 64, 57
See application file for complete search history.

(56) References Cited

U.S. PATENT DOCUMENTS

| 4,138,862 | A | * | 2/1979 | Muller | ........................... 62/508 |
| 4,514,652 | A | | 4/1985 | Olson | |
| 4,647,805 | A | | 3/1987 | Flygare et al. | |
| 4,839,547 | A | * | 6/1989 | Lordo et al. | ................ 310/60 A |
| 4,862,024 | A | | 8/1989 | Stingle et al. | |
| 4,908,538 | A | * | 3/1990 | Geberth, Jr. | ..................... 310/59 |
| 4,994,700 | A | | 2/1991 | Bansal et al. | |
| 5,789,833 | A | * | 8/1998 | Kinoshita et al. | ............... 310/64 |
| 6,437,468 | B2 | | 8/2002 | Stahl et al. | |
| 6,570,276 | B1 | * | 5/2003 | Morel et al. | .................... 310/52 |
| 6,727,609 | B2 | | 4/2004 | Johnsen | |
| 7,327,055 | B2 | | 2/2008 | Devine | |
| 7,633,193 | B2 | * | 12/2009 | Masoudipour et al. | ......... 310/54 |

(Continued)

FOREIGN PATENT DOCUMENTS

DE 4442427 * 6/1996
DE 19905539 * 8/2000

(Continued)

OTHER PUBLICATIONS

English Machine Translation, JP 2007-325436, Hashimo et al., Dec. 13, 2007.*

(Continued)

*Primary Examiner* — Burton Mullins
(74) *Attorney, Agent, or Firm* — Cantor Colburn LLP

(57) ABSTRACT

A permanent magnet electric machine includes a rotor having a plurality of permanent magnets and a stator in magnetic communication with the rotor and positioned defining a radial air gap between the rotor and the stator. A housing is configured to seal the rotor and the stator from an outside environment. A pumping element is configured to urge a closed loop airflow across the plurality of permanent magnets to remove thermal energy therefrom, and a plurality of cooling channels are located in the housing and are configured to transfer thermal energy from the stator to a flow of fluid coolant through the plurality of cooling channels. A heat exchanger is located in thermal communication with the plurality of cooling channels to transfer thermal energy from the airflow to the fluid coolant.

13 Claims, 3 Drawing Sheets

(56) References Cited

U.S. PATENT DOCUMENTS

| | | | |
|---|---|---|---|
| 7,701,095 B2 | 4/2010 | Gizaw et al. | |
| 7,808,136 B2 | 10/2010 | Knauff | |
| 7,911,091 B2 | 3/2011 | Takenaka et al. | |
| 2008/0036314 A1* | 2/2008 | Kanei et al. | 310/59 |
| 2011/0241350 A1 | 10/2011 | Kori et al. | |
| 2012/0001508 A1 | 1/2012 | Mantere et al. | |

FOREIGN PATENT DOCUMENTS

| | | | | |
|---|---|---|---|---|
| EP | 2372881 A2 | 10/2011 | | |
| JP | 6-335203 | * 12/1994 | | |
| JP | 2005-039926 | * 10/2005 | | H02K 9/06 |
| JP | 2007-325436 | * 12/2007 | | |
| WO | 2010109056 A1 | 9/2010 | | |

OTHER PUBLICATIONS

English Machine Translation, Hayashi et al., JP 2005-039926, Oct. 2005.*

* cited by examiner

COOLING OF PERMANENT MAGNET ELECTRIC MACHINE

BACKGROUND OF THE INVENTION

The subject matter disclosed herein relates to electric machines. More specifically, the subject disclosure relates to cooling of permanent magnet electric machines.

Permanent magnet electric machines such as motors and generators have been in use for many years. Permanent magnet machines have been favored over other types due to their efficiency, simplicity, robustness and tolerance to large radial air gaps between the rotor and the stator of the machine. Permanent magnet machines, however, require cooling of the permanent magnets to prevent demagnetization of the permanent magnets. This begins to occur generally for some magnet materials when the permanent magnets exceed a temperature of about 200 degrees Celsius, while others can begin to demagnetize at lower temperatures. Once demagnetization occurs, the electric machine is no longer capable of meeting specified performance targets.

Several methods to prevent demagnetization are typically used. First, the machine may be designed with enough excess capability to reduce the magnet thermal load. This, however, results in machines that are overly physically large. Other machines utilize a fan to introduce relatively cool air to the permanent magnet surfaces. This type of cooling cannot be used, however, when the machine needs to be sealed from the outside environment. A third method is to flood the rotor cavity of the machine with coolant. This is useful in machines that must be sealed from the outside environment, but windage losses on the rotor, due to the presence of the coolant can impact efficiency of the machine rather severely. A fourth method utilizes an active system where coolant a sprayed directly onto the magnets or is circulated through the rotor assembly. This approach typically requires a lubrication system and scavenge system, especially if the machine cannot gravity drain.

BRIEF DESCRIPTION OF THE INVENTION

According to one aspect of the invention, a cooling system for a sealed permanent magnet electric machine includes a fan element configured to urge an airflow across a plurality of permanent magnets of a rotor of the electric machine to remove thermal energy therefrom. A plurality of cooling channels are located in a housing of the electric machine and are configured to transfer thermal energy from a stator of the electric machine to a flow of liquid coolant through the plurality of cooling channels. A heat exchanger is located in thermal communication with the plurality of cooling channels to transfer thermal energy from the airflow to the liquid coolant.

According to another aspect of the invention, a permanent magnet electric machine includes a rotor having a plurality of permanent magnets and a stator in magnetic communication with the rotor and positioned defining a radial air gap between the rotor and the stator. A housing is configured to seal the rotor and the stator from an outside environment. A fan element is configured to urge an airflow across the plurality of permanent magnets to remove thermal energy therefrom, and a plurality of cooling channels are located in the housing and are configured to transfer thermal energy from the stator to a flow of liquid coolant through the plurality of cooling channels. A heat exchanger is located in thermal communication with the plurality of cooling channels to transfer thermal energy from the airflow to the liquid coolant.

According to yet another aspect of the invention, a method of cooling a sealed permanent magnet electric machine includes moving a flow of liquid coolant through a plurality of cooling channels in a housing of the electric machine. Thermal energy is transferred from a stator of the electric machine to the liquid coolant flowing through the plurality of cooling channels. Air is circulated inside of the housing past a plurality of permanent magnets of a rotor of the electric machine and thermal energy is transferred from the plurality of permanent magnets to the air. The thermal energy of the air is then transferred from the air to the liquid coolant.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
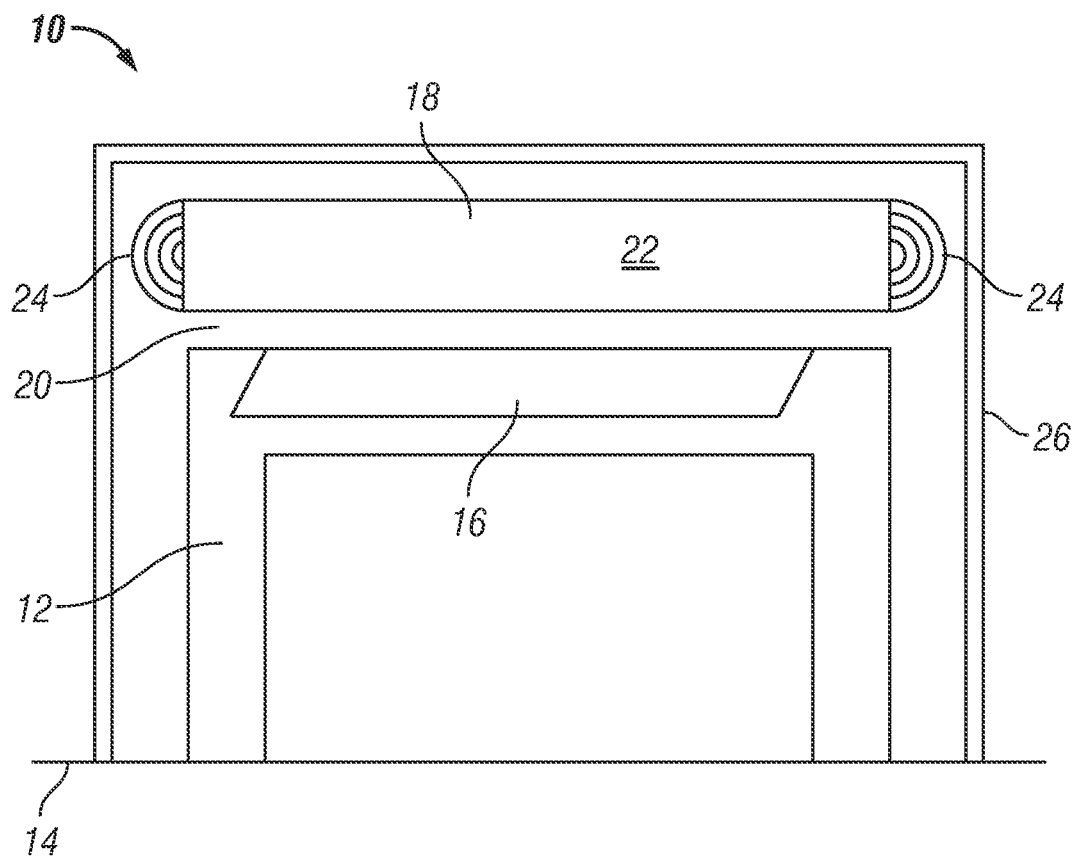
FIG. 1 is a cross-sectional view of an embodiment of a permanent magnet electric machine.

Shown in FIG. 1 is a cross-sectional view of a permanent magnet electric machine 10. The electric machine 10 includes a rotor assembly 12 rotatably located at an electric machine axis 14. The rotor 12 includes a plurality of permanent magnets 16. A stator 18 is located radially outboard of the rotor 12 defining a radial air gap 20 between the stator 18 and the rotor 12. The stator 18 includes a stator core 22 and a plurality of stator windings 24 extending through the stator core 22 which are magnetically interactive with the permanent magnets 16. The rotor 12 and stator 18 are located inside of a housing 26 which seals the electric machine 10 from the outside environment.

Figure 2:
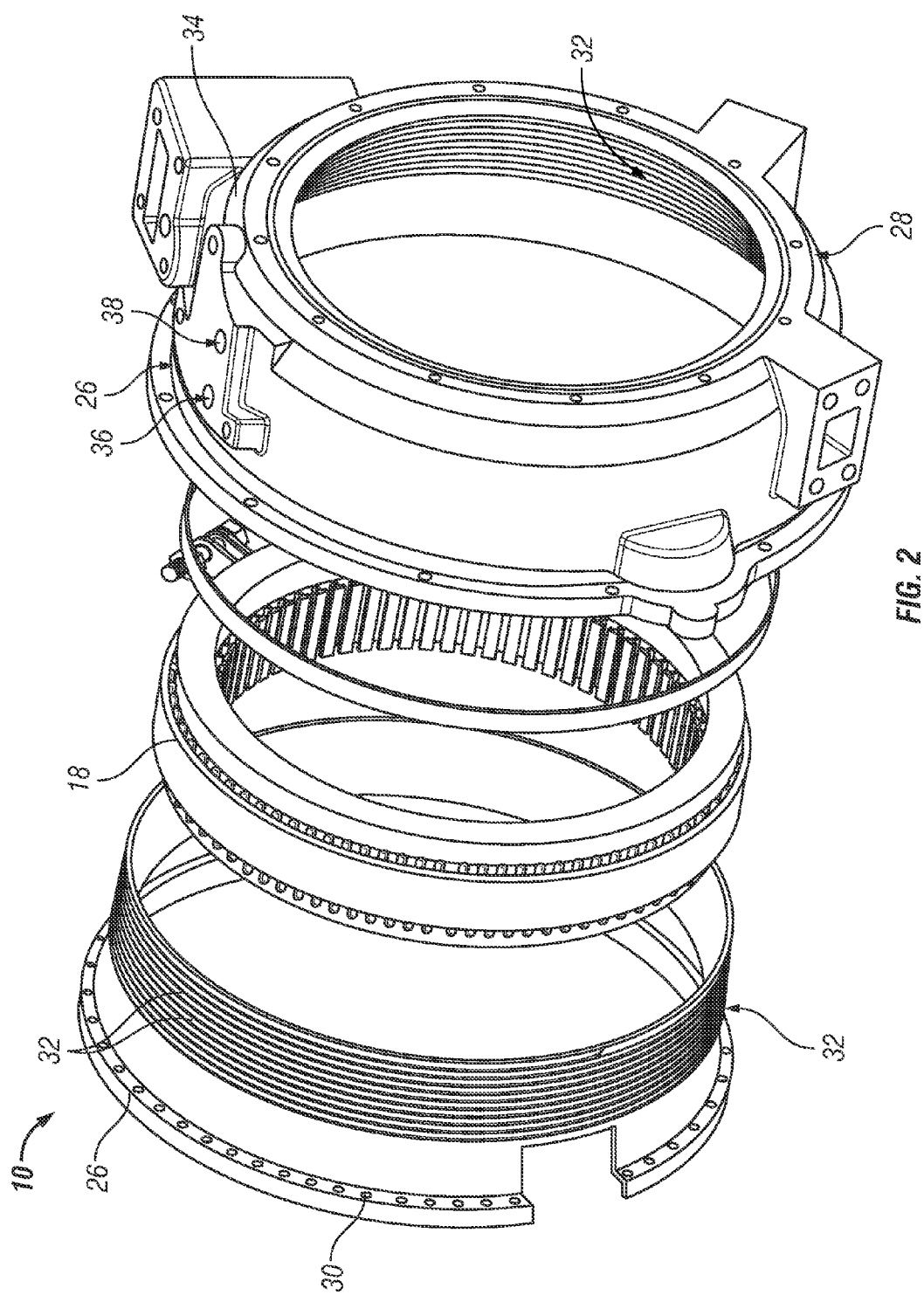
FIG. 2 is an exploded view of an embodiment of a permanent magnet electric machine.
Figure 3:
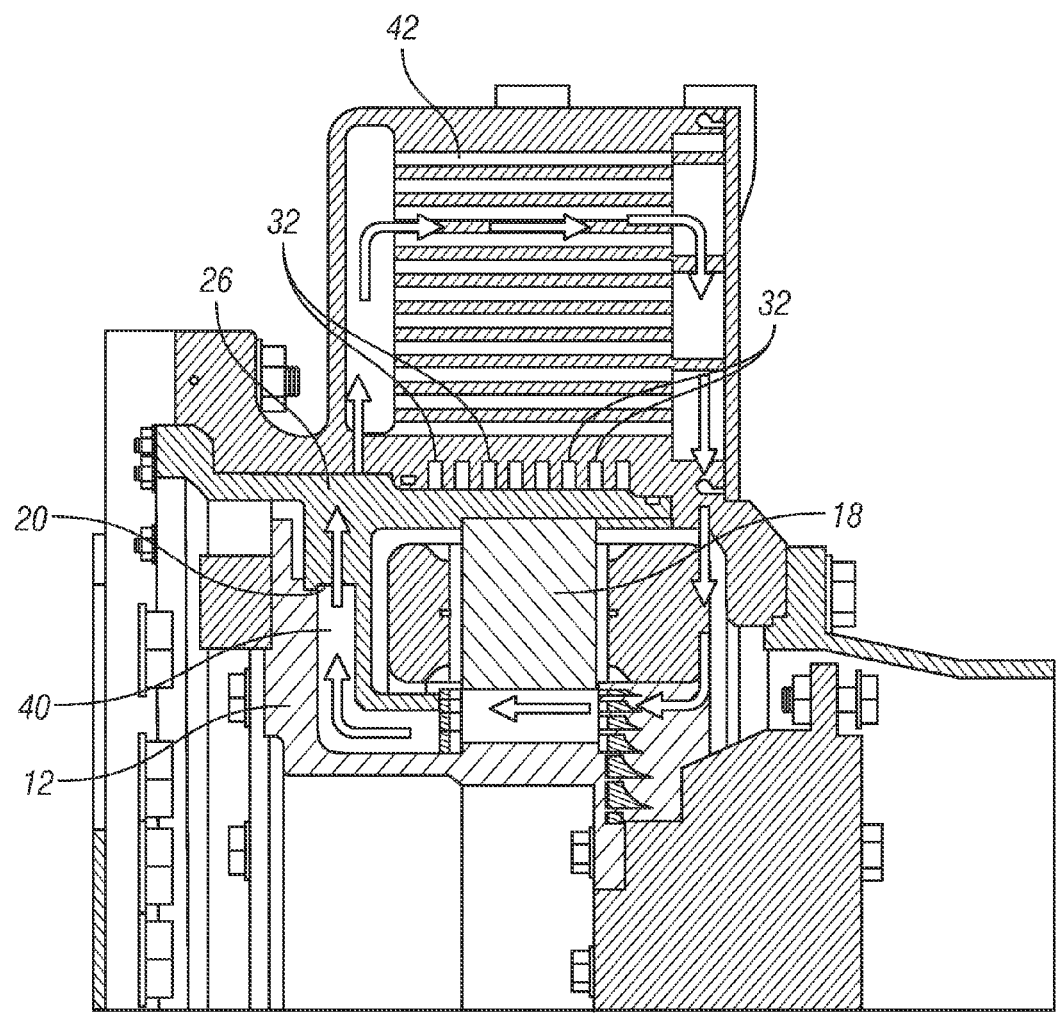
FIG. 3 is another cross-sectional view of an embodiment of a permanent magnet electric machine.

Shown in FIG. 2 is an exploded view of the electric machine 10. The housing 26 includes an outer housing 28 and an inner housing 30 located between the outer housing 28 and the stator 18. A plurality of cooling channels 32 are located in the housing 26 between the stator 18 and an outer diameter 34 of the housing 26. As shown in FIG. 2, in some embodiments, the plurality of cooling channels 32 extend circumferentially around the electric machine 10. It is to be appreciated, however, that other arrangements of cooling channels 32, for example labyrinthine or axially-extending cooling channels 32 are contemplated within the scope of the present disclosure. One or more coolant inlets 36 and one or more coolant outlets 38 are located in the housing 26 and are connected to the plurality of cooling channels 32 for input of coolant to and output of coolant from the plurality of cooling channels 32. The coolant is, for example, water, or a mixture of water and ethylene glycol, or a mixture of water and propylene glycol. Coolant is input into the plurality of cooling channels 32 via the one or more coolant inlets 36 from a coolant source (not shown). As the coolant flows through the plurality of cooling channels 32, as shown in FIG. 3, thermal energy is transferred to the coolant from the stator 18. The coolant flows through the plurality of cooling channels 32 without entering the rotor 12. The coolant exits the housing 26 via the one or more coolant outlets 38 and the thermal energy is dissipated external to the electric machine 10.

Referring still to FIG. 3, the electric machine 10 further includes an air cooling circuit. A pumping element, for example, a centrifugal blower 40 is located at the rotor 12. Even though the electric machine 10 is sealed from the outside environment, a volume of air is present inside the housing 26. When driven by the rotor 12, the centrifugal blower 40 adds head to the volume of air in the housing 26, forcing the air over the permanent magnets 16 and across the air gap 20 to establish a closed loop airflow. It is to be appreciated that while the embodiment of FIG. 3 includes a centrifugal blower 40, other embodiments may include other fan elements to add head to the volume of air. For example, some embodiments may include fan features integral to, or attached to, the rotor 12. The air flow across the permanent magnets 16 transfers thermal energy from the permanent magnets 16 to the air. The air flows across the air gap 20 and into a heat exchanger 42 integral with the housing 26 radially outboard of the plurality of cooling channels 32. While the embodiment of FIG. 3 includes a heat exchanger 42 integral with the housing 26, it is to be appreciated that other embodiments may include other heat exchanger 42 configurations and/or locations. For example, the eat exchanger 42 may be secured to an exterior of the housing 26, or in another location, with cooling channels 26 extending to the heat exchanger 42. At the heat exchanger 42, the thermal energy in the air is transferred into the heat exchanger 42 and then subsequently into the coolant flowing through the cooling channels 32. The coolant removes the thermal energy from the electric machine as described previously. The centrifugal blower 40 maintains the flow of air through the machine such that when the heat is removed in the heat exchanger 42, the air circulates back to the rotor 12 across the air gap 20 and across the permanent magnets 16 to absorb more heat therefrom.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A cooling system for a sealed permanent magnet electric machine comprising:
   a pumping element configured to urge an airflow across a plurality of permanent magnets of a rotor of the electric machine to remove thermal energy therefrom;
   a plurality of cooling channels disposed in a housing of the electric machine configured to transfer thermal energy from a stator of the electric machine to a flow of fluid coolant through the plurality of cooling channels;
   a coolant inlet disposed at an exterior wall of the electric machine to introduce the flow of fluid coolant into the plurality of cooling channels;
   a coolant outlet disposed at the exterior wall of the electric machine to direct the flow of coolant fluid out of the plurality of cooling channels such that thermal energy is dissipated from the flow of fluid coolant external to the electric machine; and
   a heat exchanger in thermal communication with the plurality of cooling channels and disposed radially outboard of the housing to transfer thermal energy from the airflow flowing therethrough to the fluid coolant, the heat exchanger including a plurality of radially stacked axially-directed heat exchanger channels to direct the airflow therethrough.

2. The cooling system of claim 1, wherein the fluid coolant is one or more of water, or water/ethyl glycol, or water/propylene glycol.

3. The cooling system of claim 1, wherein the plurality of cooling channels extend substantially circumferentially around the stator.

4. The cooling system of claim 1, wherein the fluid coolant flows through the electric machine without flowing through the rotor.

5. The cooling system of claim 1, wherein the pumping element is a centrifugal blower.

6. A permanent magnet electric machine comprising:
   a rotor including a plurality of permanent magnets;
   a stator in magnetic communication with the rotor and positioned defining a radial air gap between the rotor and the stator;
   a housing configured to seal the rotor and the stator from an outside environment;
   a pumping element configured to urge an airflow across the plurality of permanent magnets to remove thermal energy therefrom;
   a plurality of cooling channels disposed in the housing configured to transfer thermal energy from the stator to a flow of fluid coolant through the plurality of cooling channels;
   a coolant inlet disposed at an exterior wall of the electric machine to introduce the flow of fluid coolant into the plurality of cooling channels;
   a coolant outlet disposed at the exterior wall of the electric machine to direct the flow of coolant fluid out of the plurality of cooling channels such that thermal energy is dissipated from the flow of fluid coolant external to the electric machine; and
   a heat exchanger in thermal communication with the plurality of cooling channels and disposed radially outboard of the housing to transfer thermal energy from the airflow flowing therethrough to the fluid coolant, the heat exchanger including a plurality of radially stacked axially-directed heat exchanger channels to direct the airflow therethrough.

7. The electric machine of claim 6, wherein the fluid coolant is one or more of water, or water/ethyl glycol, or water/propylene glycol.

8. The electric machine of claim 6, wherein the plurality of cooling channels extend substantially circumferentially around the stator.

9. The electric machine of claim 6, wherein the fluid coolant flows through the electric machine without flowing through the rotor.

10. The electric machine of claim 6, wherein the heat exchanger is integral to the housing.

11. A method of cooling a sealed permanent magnet electric machine comprising:
    moving a flow of fluid coolant through a plurality of cooling channels in a housing of the electric machine;

transferring thermal energy from a stator of the electric machine to the fluid coolant flowing through the plurality of cooling channels;

urging a circulation of air inside of the housing past a plurality of permanent magnets of a rotor of the electric machine;

transferring thermal energy from the plurality of permanent magnets to the air;

transferring thermal energy from the air to the fluid coolant, via a heat exchanger disposed radially outboard of the housing;

flowing the fluid coolant from the electric machine via a coolant outlet; and dissipating thermal energy from the fluid coolant external to the electric machine.

12. The method of claim 11, comprising urging the circulation of air via a pumping element in operable communication with the rotor.

13. The method of claim 11, comprising introducing the fluid coolant to the housing via one or more coolant inlets.

* * * * *